United States Patent Office 2,782,200
Patented Feb. 19, 1957

2,782,200

PROCESS FOR PREPARING 3-(4'-CHLOROBENZ-HYDRYLOXY)-TROPANE

Cyril H. Nield, New Brunswick, N. J., and William F. X. Bosch, Brooklyn, N. Y., assignors to Schenley Laboratories, Inc., New York, N. Y., a corporation of Delaware No Drawing. Application July 12, 1955,
Serial No. 521,611

7 Claims. (Cl. 260—292)

This invention relates to the condensation of 3-tropanol with 4-chlorobenzhydryl chloride to form 3-(4'-chlorobenzhydryloxy)-tropane, which is useful as an antispasmodic and anti-histaminic.

The reaction of diphenyldiazomethane with tropine or pseudotropine in an inert solvent is known. The reaction product (tropine benzhydryl ether) has some antispasmodic and anti-histaminic activity but suffers from the disadvantages that the process is not commercially feasible and the activity of the product is relatively weak and of short duration. The subsequently proposed use of a diphenylhalomethane in a lower aliphatic carboxylic acid did not solve those problems. As a result, further investigations have been carried out for the purpose of endeavoring to find a more effective method and compound.

In accordance with the present invention, 3-tropanol is condensed with 4-chlorobenzhydryl chloride at an increased temperature with or without a solvent, such as xylol, or in the presence of sodium carbonate, the condensation being carried out with from one to two mols of 3-tropanol per mol of 4-chlorobenzhydryl chloride. The resulting 3-(4'-chlorobenzhyryloxy)-tropane has been found to have unique and valuable properties as an antispasmodic and anti-histaminic.

The invention is illustrated by the following examples without limiting it thereto:

Example I

A solution of 28.2 grams (0.2 mol) of 3-tropanol is prepared in 50 ml. of xylol, and to this solution is added 23.8 grams (0.1 mol) of 4-chlorobenzhydryl chloride. The resultant solution is heated for 7 hours at a temperature in the range of 145–155° C., following which the mixture is cooled and filtered. The clear filtrate thus obtained is washed with 50 ml. of 5% aqueous potassium carbonate solution and then with three successive 25 ml. portions of water. The xylol solution is then extracted with three successive 50 ml. portions of 2 N hydrochloric acid. The xylol layer is discarded and the acid extracts are combined and rendered strongly basic by the addition of 22.5% aqueous potassium hydroxide, resulting in the formation of an oily base which separates and which is then extracted with benzol, from which the benzol is evaporated to yield crude 3-(4'-chlorobenzhydryloxy)-tropane as a brown oil.

Two grams of this oily base is treated with 10 ml. of 4.5 N isopropanolic hydrogen chloride solution, and the pasty mixture which results is diluted with approximately 30 ml. of absolute ether. A solid product is formed which is separated by filtration and then washed with absolute ether. The product is then purified by dissolving it in hot isopropanol, followed by clarification with activated charcoal. Upon cooling the filtrate, the product separates as a crystalline powder and may, if necessary or desired, be further purified by repeating this procedure. The product is white and melts at 215–217° C.

Example II

The procedure set forth in Example I was repeated except that 14.1 grams (0.1 mol) of tropanol is used instead of 28.2 grams, and 11 grams of sodium carbonate (excess) is used in place of the 14.1 grams of excess tropanol of Example I. The same product was produced having the same characteristics and melting point.

By following the present procedure, good yields of relatively pure 3-(4'-chlorobenzhyryloxy)-tropane hydrochloride can be prepared and which has superior antispasmodic and anti-histaminic activity over a relatively long period of time with rapid initial action. The condensation may be represented by the following reaction scheme:

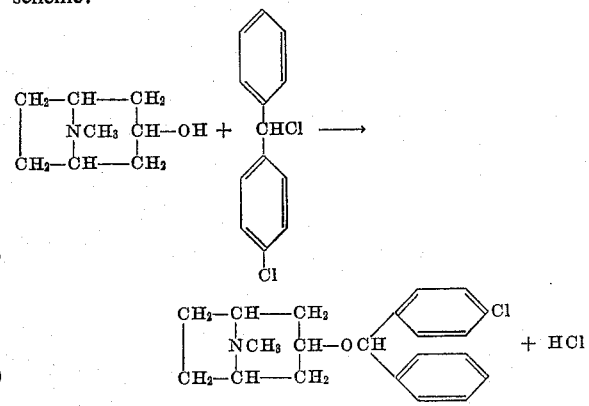

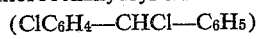

The invention, which is defined by the appended claims, comprises the steps hereinabove set forth, wherein 1–2 mols of 3-tropanol is condensed with 1 mol of 4-chlorobenzhydryl chloride, particularly under the conditions set forth. The 4-chlorobenzhydryl chloride (ClC₆H₄—CHCl—C₆H₅)

starting material may be produced in any suitable manner similar to that described by Norris and Banta (J. A. C. S. (1928), p. 1807).

We claim:

1. A process for the preparation of 3-(4'-chlorobenzhydryloxy)-tropane hydrochloride which comprises heating at a temperature of 145°–155° C. a solution of 3-tropanol in xylol to which 4-chlorobenzhydryl chloride has been added, filtering, washing the filtrate produced by filtering, extracting the washed filtrate with hydrochloric acid, separating the acid extract from the xylol layer thus formed, alkalinizing the acid extract with potassium hydroxide, extracting the oily base which separates with benzol, evaporating the benzol, and converting the crude product resulting therefrom to its hydrochloride by treating it with alcoholic hydrogen chloride.

2. A process according to claim 1, in which half of the 3-tropanol is replaced by sodium carbonate.

3. A process for the preparation of 3-(4'-chlorobenzhydryloxy)-tropane hydrochloride which comprises forming 3-(4'-chlorobenzhydryloxy)-tropane base by heating together 3-tropanol and 4-chlorobenzhydryl chloride, converting the said base to its hydrochloride salt by treating it with a non-aqueous solution of hydrogen chloride, and purifying the hydrochloride salt by crystallization from a solvent therefor.

4. A process for the preparation of 3-(4'-chlorobenzhydryloxy)-tropane hydrochloride which comprises forming 3-(4'-chlorobenzhydryloxy)-tropane base by heating together 3-tropanol and 4-chlorobenzhydryl chloride in a neutral solvent, converting the said base to its hydrochloride salt by treating it with a non-aqueous solution of hydrogen chloride, and purifying the hydrochloride salt by crystallization from a solvent therefor.

5. A process for the preparation of 3-(4'-chlorobenzhydryloxy)-tropane hydrochloride which comprises forming 3-(4'-chlorobenzhydryloxy)-tropane base by heating together 3-tropanol and 4-chlorobenzhydryl chloride in xylol, converting the said base to its hydrochloride salt by treating it with a non-aqueous solution of hydrogen chloride, and purifying the hydrochloride salt by crystallization from a solvent therefore.

6. A process for the preparation of 3-(4'-chlorobenzhydryloxy)-tropane hydrochloride which comprises forming 3-(4'-chlorobenzhydryloxy)-tropane base by heating together at a temperature of about 145–155° C. 3-tropanol and 4-chlorobenzhydryl chloride, converting the said base to its hydrochloride salt by treating it with an alcoholic solution of hydrogen chloride, and purifying the hydrochloride salt by crystallization from a solvent therefor.

7. A process for the preparation of 3-(4'-chlorobenzhydryloxy)-tropane hydrochloride which comprises forming 3-(4'-chlorobenzhydryloxy)-tropane base by heating together 3-tropanol and 4-chlorobenzhydryl chloride in the proportions of 1–2 mols of 3-tropanol to 1 mol of 4-chlorobenzhydryl chloride, converting the said base to its hydrochloride salt by treating it with an isopropanolic solution of hydrogen chloride, and purifying the hydrochloride salt by crystallization from isopropanol.

References Cited in the file of this patent
UNITED STATES PATENTS 2,706,198    Weijlard  ----------------  Apr. 12, 1955